US008392985B2

(12) United States Patent
Natu et al.

(10) Patent No.: US 8,392,985 B2
(45) Date of Patent: Mar. 5, 2013

(54) SECURITY MANAGEMENT IN SYSTEM WITH SECURE MEMORY SECRETS

(75) Inventors: Mahesh Natu, Portland, OR (US); Shamanna Datta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 12/319,193

(22) Filed: Dec. 31, 2008

(65) Prior Publication Data
US 2010/0169599 A1  Jul. 1, 2010

(51) Int. Cl.
*H04L 29/06* (2006.01)
(52) U.S. Cl. .......................................... 726/16
(58) Field of Classification Search ...................... 726/16
See application file for complete search history.

(56) References Cited

U.S. PATENT DOCUMENTS

| | | | | |
|---|---|---|---|---|
| 2003/0196100 | A1* | 10/2003 | Grawrock et al. | 713/193 |
| 2004/0250124 | A1* | 12/2004 | Chesla et al. | 713/201 |
| 2005/0216954 | A1* | 9/2005 | Ramaiah et al. | 726/22 |
| 2005/0273602 | A1* | 12/2005 | Wilson et al. | 713/164 |

OTHER PUBLICATIONS

TCG, "TPM Main, Part 2 TPM Structures, Specification version 1.2, level 2, Revision 85", Feb. 13, 2005, all pages.*
Intel, "Intel trusted Execution Technology, Software Development Guide" Jun. 2008, all pages.*
Natu, Mahesh S. et al., "Security Management in Multi-Node, Multi-Processor Platforms", U.S. Appl. No. 11/968,128, filed Dec. 31, 2007.
Natu, Mahesh S. et al., "Supporting Advanced RAS Features in a Secured Computing System", U.S. Appl. No. 11/863,563, filed Sep. 28, 2007.
Natu, Mahesh et al., "Firmware Integrity Verification", U.S. Appl. No. 11/965,295, filed Dec. 27, 2007.
Zimmer, Vincent J. et al., "Apparatus and Method for Secure Boot Environment", U.S. Appl. No. 12/215,071, filed Jun. 25, 2008.
Datta, Sham M. et al., "Enabling System Management Mode in a Secure System", U.S. Appl. No. 11/967,779, filed Dec. 31, 2007.

* cited by examiner

*Primary Examiner* — Michael S McNally
(74) *Attorney, Agent, or Firm* — International IP Law Group, P.L.L.C.

(57) ABSTRACT

In some embodiments a Trusted Platform Module (TPM) manages a first flag that identifies whether a secure environment has ever been established. A chipset manages a second flag that identifies that there might have been secrets in memory and a reset or power failure occurred. At least one processor and/or the chipset lock, maintain a lock, and/or unlock a memory in response to the second flag. Other embodiments are described and claimed.

23 Claims, 3 Drawing Sheets

SECRETS FLAG 302

ESTABLISHED FLAG 304

WAKE-ERROR.STS 306

FIG 3

SECURITY MANAGEMENT IN SYSTEM WITH SECURE MEMORY SECRETS

TECHNICAL FIELD

The inventions generally relate to security management systems with secure memory secrets.

BACKGROUND

Some computer hardware is designed to maintain secret information against software and other attacks. Some computer hardware uses hardware hooks in the processors and chipsets to protect memory secrets. Memory secrets may include things like encryption keys, passwords, personal data, etc. for protection from malicious agents. Some hardware can remember the presence of secrets in memory across a platform reset/power cycle, and memory controllers can lock memory upon these platform events.

VMM (Virtual Machine Monitor) or components in the launch environment software can place and remove secrets in system memory. VMM explicitly notifies the hardware about the presence of secrets. VMM manages secrets in memory using a write CMD.SECRETS or CMD.NOSECRETS to hardware protected registers, depending on the presence of memory secrets. The hardware protected registers are located, for example, in an Input/Output Hub (IOH) portion of the chipset or in a South Bridge part of the chip set). These registers are protected by hardware from attack. In current industry implementations software and/or firmware code may be written in motherboard components by an Original Equipment Manufacturer (OEM). This OEM code is executed on every reset and performs processor/chipset initialization. If the OEM does not appropriately protect this code, an attacker can substitute rogue code which allows the secrets to be accessed.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

FIG. 3 illustrates an apparatus according to some embodiments of the inventions.

DETAILED DESCRIPTION

Some embodiments of the inventions relate to security management systems with secure memory secrets.

In some embodiments a Trusted Platform Module (TPM) manages a first flag known as ESTABLISHED, that identifies whether a secure environment has ever been established on this platform. A chipset manages a second flag that identifies that there might have been secrets in memory and a reset or power failure occurred. All processors and/or the chipset lock, maintain a lock, and/or unlock a memory in response to the second flag.

In some embodiments a first flag (ESTABLISHED) is managed that identifies whether a secure environment has ever been established. A nonvolatile second flag, called SECRETS flag, is managed that identifies that there might have been secrets in memory and a reset or power failure occurred. A memory is locked, a lock on the memory is maintained, and/or the memory is unlocked in response to the second flag.

Figure 1:
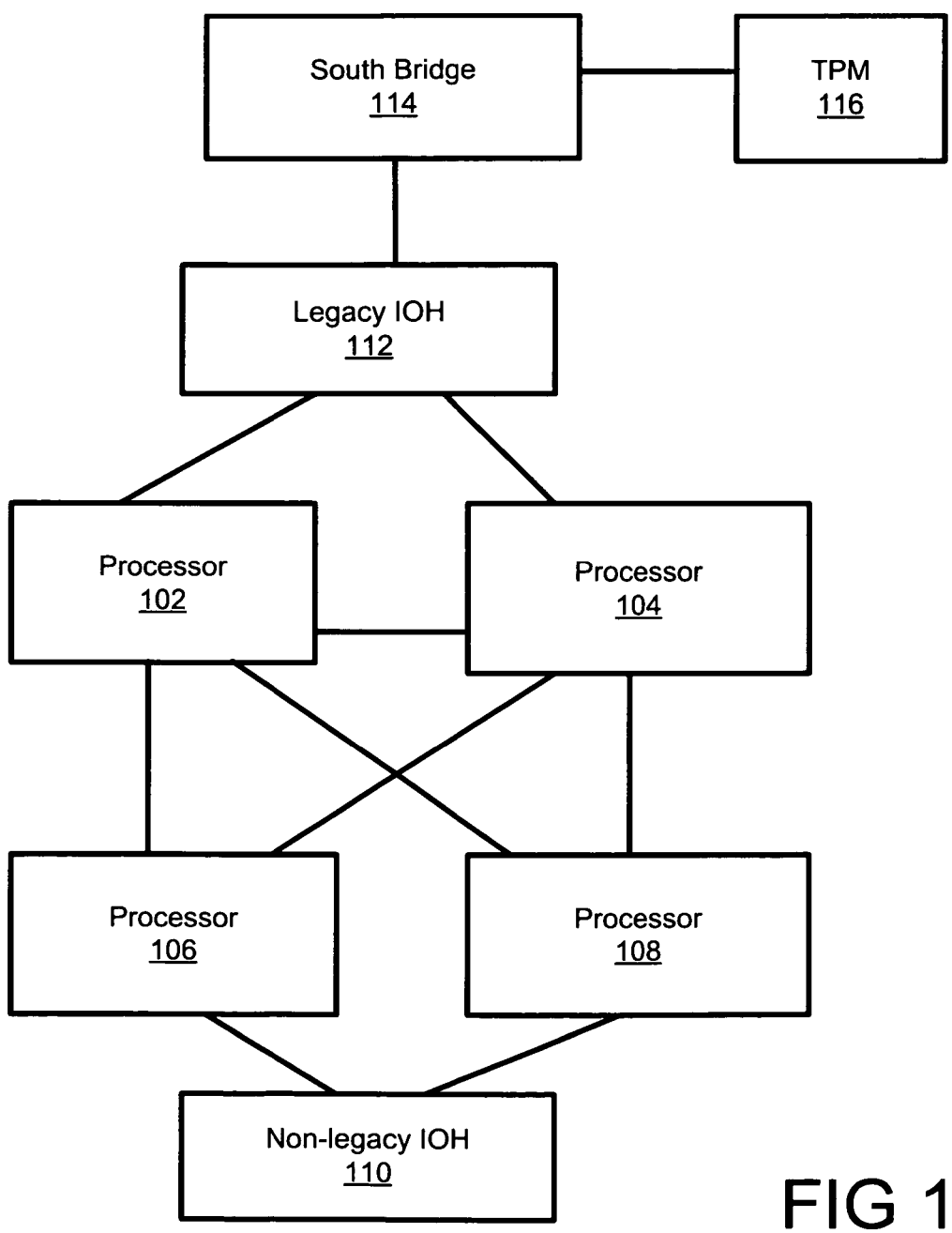
FIG. 1 illustrates a system according to some embodiments of the inventions.

FIG. 1 illustrates a system 100 according to some embodiments. In some embodiments system 100 includes a processor 102, a processor 104, a processor 106 and a processor 108. The connections between the processors illustrated in FIG. 1 may be, in some embodiments, Intel QuickPath Interconnect (QPI) buses, or any other type of links, connections, or buses. System 100 further includes a non-legacy Input/Output Hub (IOH) 110, a legacy IOH 112, a South Bridge 114, and a Trusted Platform Module (TPM) 116. In some embodiments, the connection between the legacy IOH 112 and the South Bridge 114 is a Desktop Management Interface (DMI). In some embodiments, additional hardware components and/or connection fabrics may be situated between the processor and the chipset.

In some embodiments, system 100 is an Intel® processor based system using the Trusted Execution Technology (TXT) architecture. The TPM 116 may be included in some embodiments in the TXT hardware, which manages a flag called ESTABLISHED in nonvolatile storage (for example, according to some embodiments, ESTABLISHED flag 304 illustrated in FIG. 3). This flag tracks whether a secure environment was ever launched on the platform. This bit is defined as having a reverse polarity to handle platforms that do not include TPM (in some embodiments). When the bit is 0, this bit indicates that ESTABLISHED=TRUE. The default setting of ESTABLISHED is FALSE. When a secure environment is being launched, a processor uses a specific TPM command known as HASH_START command. A side effect of this command is that the TPM 116 changes the ESTABLISHED flag to the TRUE state. This command can only be issued by processor hardware.

A "Secrets in Memory" flag (for example, according to some embodiments, SECRETS flag 302 illustrated in FIG. 3) can be incorrect if a platform real time clock (RTC) battery loses power, or if the platform has been newly assembled with a new RTC battery. If ESTABLISHED=TRUE, there cannot be any secrets in memory. This is used to prevent accidental memory locking in non-TXT configurations during a first boot in the factory. The processor uses these two flags to determine whether or not memory should be locked.

First, the processor reads the "Secrets in Memory" flag (SECRETS). Then, if the "Secrets in Memory" flag=0, unlock the memory. If the "Secrets in Memory" flag=1, then read the ESTABLISHED flag from the TPM. If ESTABLISHED=1, then unlock the memory. If ESTABLISHED=0, then maintain the memory in a locked condition. This logic is also illustrated in the following truth table.

| SECRETS | ESTABLISHED | Behavior |
| --- | --- | --- |
| 0 | X | Memory unlocked |
| 1 | 0 | Memory Stays Locked |
| 1 | 1 (covers no TPM case and RTC failed case) | Memory Unlocked |

In some embodiments, processors 102, 104, 106, and/or 108 are server processors that support glueless topologies. For example, in some embodiments, these glueless technologies contain between one and eight processors and between one and four IOH components. In some embodiments according to this configuration, exactly one IOH is configured as a legacy IOH (for example, legacy IOH 112) and decodes all TXT/TPM registers. The legacy IOH may be connected to IO Controller Hub (ICH) that contains the SECRETS flag. The TPM is behind ICH (for example, TPM 116) and contains the ESTABLISHED flag. Other IOHs (for example, IOH 110 in system 100) will drop all writes to TXT/TPM registers and return all "1"s on reads.

Figure 2:
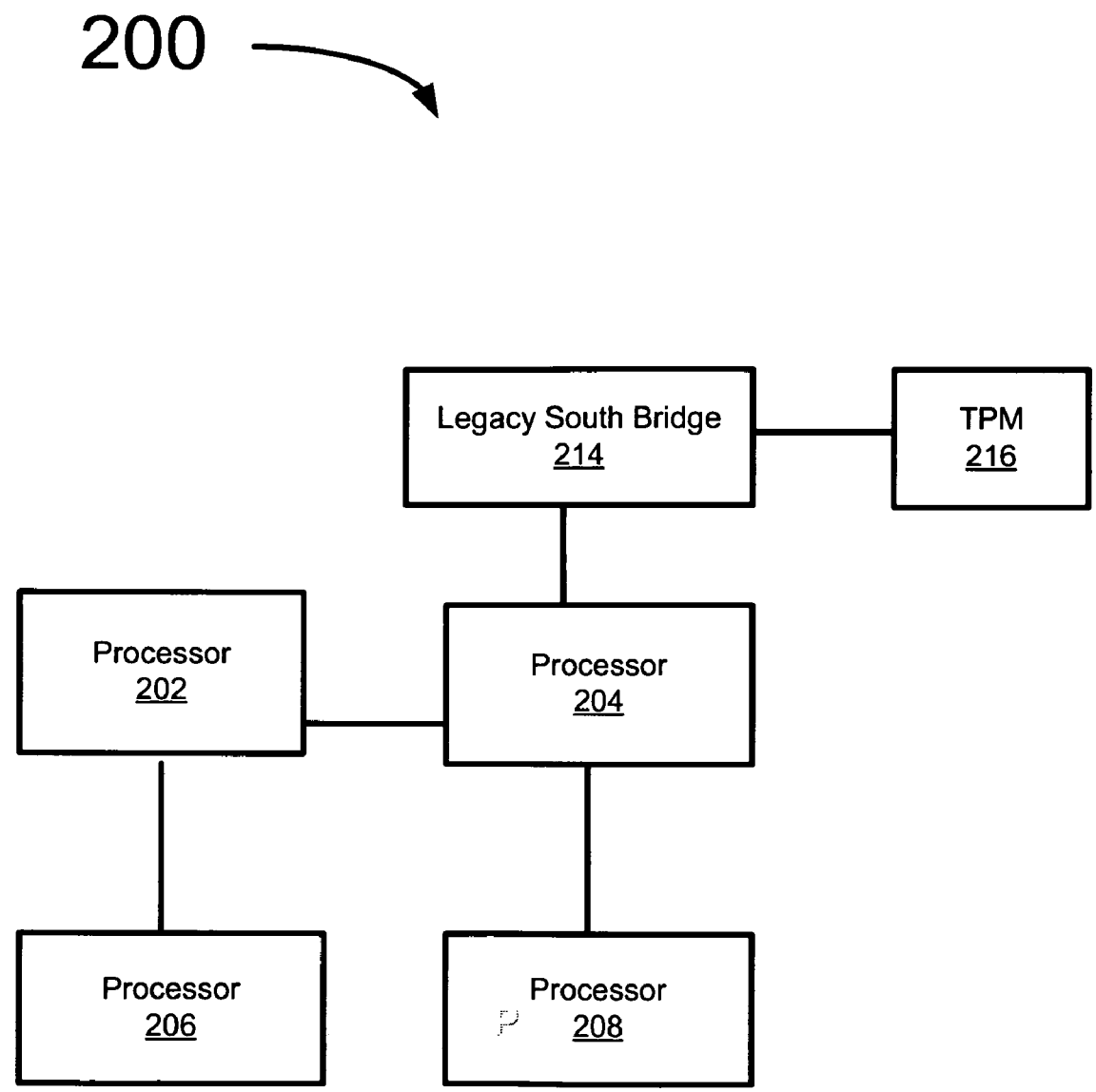
FIG. 2 illustrates a system according to some embodiments of the inventions.

FIG. 2 illustrates a system 200 according to some embodiments. In some embodiments system 200 includes a processor 202, a processor 204, a processor 206 and a processor 208. The connections between the processors illustrated in FIG. 2 may be, in some embodiments, Intel QuickPath Interconnect (QPI) buses, or any other type of links, connections, or buses. System 200 further includes a legacy South Bridge 214 and a Trusted Platform Module (TPM) 116. In some embodiments, the connection between the processor 204 and the legacy South Bridge 214 is a Desktop Management Interface (DMI). In some embodiments, system 200 is an Intel® processor based system using the Trusted Execution Technologies (TXT) architecture. In some embodiments, processors 202, 204, 206, and/or 208 are server processors that support glueless topologies. For example, in some embodiments, these glueless technologies contain between one and eight processors and/or support more than one South Bridge.

According to some embodiments, a processor needs to read SECRETS and ESTABLISHED flags (for example, according to some embodiments, SECRETS flag 302 and ESTABLISHED flag 304 illustrated in FIG. 3) before the Basic Input/Output System (BIOS) can initialize memory. The registers holding these flags are dispersed in some embodiments across legacy IOH, ICH, and/or TPM. However, from processor perspective, these registers are accessible as soon as the TXT path between the processor and the legacy IOH is established. Configuring the TXT path means that the TXT source address decoder in the processor and the routing tables must be configured so that the processor generated accesses to the TXT/TPM registers reach the legacy IOH, for example. Some processors (for example, in some embodiments, processors 102, 104, 106, and/or 108) contain some on-die Intel code that is responsible for configuring the QPI path. In order to keep this code simple; it may be limited to configuring a path to components that are only one hop away. As a result, the path from processors 106 and 108 to the legacy IOH 110, for example, may not be configured by INITROM code (Read Only Memory initialization code). In general, the system configuration may be such that the INITROM code is unable to establish the path for certain processors. In some embodiments, a platform such as system 100 relies on the BIOS or a BMC (Baseboard Management Controller, also known as System Service Processor or SSP) to configure a path between processors 106 and 108 and the legacy IOH 110, for example.

In some embodiments, INITROM code is written by the processor manufacturer and programmed into the processor during manufacturing, and cannot be modified in the field. As a result, the INITROM code can be trusted to configure the path correctly.

BIOS and/or BMC and/or other code is typically written by the Original Equipment Manufacturer (OEM) and located on motherboard components. Many OEMs do not protect this code well enough. If the code is not protected, an attacker can substitute this code with rogue code. A properly written BIOS will correctly initialize the TXT path. However, a rogue BIOS or BMC code can program an address decoder of one or more of the processors so that the TXT path points to a non-legacy IOH. As stated above, non-legacy IOH does not decode TXT/TPM registers and the processor accesses to the TPM will all return "1"s. This will be interpreted by the processor as SECRETS=TRUE, and ESTABLISHED=FALSE. As a result the processor or processors will unlock the memory controllers regardless of the official state of the SECRETS and ESTABLISHED flags. This subverts memory protection mechanisms, and allows a hacker to steal secrets from memory.

A similar problem exists for TXT platforms including single socket client platforms. The read to the ESTABLISHED bit utilizes a DMI bus, for example. It is possible for rogue software to mis-configure the DMI bus so that the read will time out. In case of a time out, the DMI bus, which follows PCI Express behavior, will abort the transaction and return all "1"s (data=0xFF) to the processor. As explained above, this will result in the processor unlocking the memory regardless of the official state of the SECRETS and ESTABLISHED flags. This subverts memory protection mechanisms, and allows a hacker to steal secrets from memory.

In some embodiments, this security gap is addressed using an alternate copy of the SECRETS flag in the chipset. For example, in some embodiments, a WAKE-ERROR.STS bit may be used as a flag (for example, in some embodiments, WAKE-ERROR.STS 306 illustrated in FIG. 3). The chipset sets this bit when it detects that there might have been secrets in memory and a reset or power failure occurred. If this bit is set after a system reset, the chipset will prevent memory accesses until memory is explicitly unlocked. The software that is authorized to unlock the memory accesses is also responsible for clearing the secrets from memory. Hardware clears WAKE-ERROR.STS bit if it detects that a read to the ESTABLISHED bit returns a "1".

| | |
|---|---|
| TXT.WAKE-ERROR.STS | The chipset sets this bit when it detects that there might have been secrets in memory and a reset or power failure occurred. |
| | If this bit is set after a system reset, the chipset will prevent memory accesses until specifically enabled. The software that is authorized to enable the memory accesses will also be responsible for clearing the secrets from memory. |
| | Hardware clears this bit if it detects that read to ESTABLISHED bit returns a 1. |

In some embodiments, the processor flow that manages memory locking/unlocking is modified as follows. First, the ESTABLISHED flag is read from the TPM. Then the WAKE-ERROR.STS flag is read. If the WAKE-ERROR.STS flag=0, then unlock the memory. Otherwise if the WAKE-ERROR.STS flag is not 0, then keep the memory locked. This flow prevents an attack as described above because a non-legacy IOH always returns a "1" for all reads to TXT registers, including WAKE-ERROR.STS. If rogue and/or buggy code such as BIOS code mis-programs the system address decoders so that TXT path points to non-legacy IOH, it cannot trick the processor into unlocking memory, and the memory on these processors will remain locked. This flow does not change the behavior on the properly configured platform. If the path is correctly configured, the read to the ESTABLISHED flag affects the WAKE-ERROR.STS flag the correct way in order to yield the correct behavior. A truth table explaining the flow according to some embodiments is as follows.

| SECRETS | ESTABLISHED | WAKE-ERROR.STS | Behavior |
|---|---|---|---|
| 0 | X | 0 | Memory unlocked |
| 1 | 0 | 1 | Memory Stays Locked. Covers attack case where Rogue SW misconfigures the links. |
| 1 | 1 (covers no TPM case) | 0 | Memory Unlocked |

In this manner, according to some embodiments, the security vulnerability discussed above can be closed so that attackers are not able to steal secrets from memory using rogue code such as rogue BIOS. Additionally, according to some embodiments, the vulnerability related to DMI misconfiguration discussed above is also closed. This is because the memory will stay locked when all "1"s are returned, and rogue software will not be allowed to get to the memory secrets. If the DMI bus is correctly configured, the memory unlocking will be based on the state of the SECRETS flag and the ESTABLISHED flag as shown in the above truth table.

In some embodiments, various system fabrics connecting the processor and the chipset are managed such that access to these flags return a predetermined value of "1" when fabrics are uninitialized or incorrectly initialized.

The inventors have identified that prior security solutions for protecting memory secrets may be susceptible to a simple software attack, particularly in larger server platforms. In some embodiments, changes to the server processors can address this problem. In addition, existing chipset implementations may be used according to some embodiments. In some embodiments, server platforms can use client chipsets such as South Bridges and still deliver Intel TXT's memory secret protection capability.

Although some embodiments have been described herein as solving problems in the context of one of the systems 100 or 200, similar embodiments of the inventions are applicable to the other system 200 or 100 as well as many other systems and/or topologies.

Although some embodiments have been described herein as being particular implementations, according to some embodiments these particular implementations may not be required. For example, while this description focuses on Intel® processor based systems using the Trusted Execution Technology (TXT) architecture, the organization, processes and associated methods can be equally applied in other computer systems:

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
   at least one processor;
   a Trusted Platform Module to manage a first flag that identifies whether a secure environment has ever been established; and
   a chipset to manage a second flag that identifies that there might have been secrets in memory and a reset or power failure occurred;
   wherein the at least one processor and/or the chipset is/are to perform one or more of lock, maintain a lock, or unlock a memory in response to the first flag and the second flag, and wherein the memory is locked or the lock is maintained in response to the first flag and the second flag if a fabric connecting the at least one processor and the chipset is uninitialized or incorrectly initialized.

2. The apparatus of claim 1, wherein the first flag is one bit, or the second flag is one bit, or both the first and second flags are one bit.

3. The apparatus of claim 1, wherein the processor or the chipset, or both the processor and chipset together is/are to prevent accesses to the memory while the second flag is set.

4. The apparatus of claim 1, wherein the processor or the chipset, or both the processor and chipset together is/are to clear secrets from the memory in response to the second flag being set.

5. The apparatus of claim 1, wherein the processor or the chipset, or both the processor and chipset together is/are to clear the second flag in response to the first flag.

6. The apparatus of claim 1, wherein the secrets in memory include one or more of encryption keys, passwords, or personal data.

7. The apparatus of claim 1, the chipset to manage a third non-volatile flag indicating that secrets have been placed in memory.

8. The apparatus of claim 7, wherein the third flag is a SECRETS flag.

9. The apparatus of claim 7, wherein the third flag is one bit.

10. The apparatus of claim 1, wherein the first flag is an ESTABLISHED flag.

11. The apparatus of claim 1, wherein the second flag is a WAKE-ERROR.STS flag.

12. The apparatus of claim 1, wherein the first and second flags are nonvolatile.

13. A method comprising:
    managing a first flag that identifies whether a secure environment has ever been established;
    managing a second flag that identifies that there might have been secrets in memory and a reset or power failure occurred; and
    one or more of locking, maintaining a lock, or unlocking a memory in response to the first flag and the second flag, wherein the memory is locked or the lock is maintained in response to the first flag and the second flag if a fabric connecting a processor and a chipset is uninitialized or incorrectly initialized.

14. The method of claim 13, wherein the first flag is one bit, the second flag is one bit, or both the first and second flags are one bit.

15. The method of claim 13, further comprising preventing accesses to the memory while the second flag is set.

16. The method of claim 13, further comprising clearing secrets from the memory in response to the second flag being set.

17. The method of claim 13, further comprising clearing the second flag in response to the first flag.

18. The method of claim 13, wherein the secrets in memory include one or more of encryption keys, passwords, or personal data.

19. The method of claim 13, further comprising managing a third flag indicating that secrets have been placed in memory.

20. The method of claim 19, wherein the third flag is a SECRETS flag.

21. The method of claim 19, wherein the third flag is one bit.

22. The method of claim 13, wherein the first flag is an ESTABLISHED flag.

23. The method of claim 13, wherein the second flag is a WAKE-ERROR.STS flag.

* * * * *